United States Patent [19]
Gerum

[11] Patent Number: 6,012,781
[45] Date of Patent: Jan. 11, 2000

[54] BRAKE CONTROL ARRANGEMENT FOR COMPOSITE VEHICLES

[75] Inventor: Eduard Gerum, Rosenheim, Germany

[73] Assignee: Knorr-Bremse Systeme fur Nutzfahrzeuge GmbH, Munich, Germany

[21] Appl. No.: 08/952,050

[22] PCT Filed: Jul. 14, 1995

[86] PCT No.: PCT/EP95/02778

§ 371 Date: Jan. 20, 1998

§ 102(e) Date: Jan. 20, 1998

[87] PCT Pub. No.: WO97/03871

PCT Pub. Date: Feb. 6, 1997

[51] Int. Cl.[7] ........................................... B60T 13/10
[52] U.S. Cl. ............................................. 303/7; 303/22.4
[58] Field of Search .................................. 303/3.15, 7.2, 303/22.4, 9.61, 9

[56] References Cited

U.S. PATENT DOCUMENTS

| | | | |
|---|---|---|---|
| 4,632,466 | 12/1986 | Grauel et al. | 303/7 |
| 5,002,343 | 3/1991 | Brearley et al. | 303/7 |
| 5,080,445 | 1/1992 | Brearley et al. | 303/7 |
| 5,427,440 | 6/1995 | Ward et al. | 303/7 |
| 5,632,530 | 5/1997 | Brearley | 303/22.4 |
| 5,848,826 | 12/1998 | Muller | 303/22.4 |

FOREIGN PATENT DOCUMENTS

| | | |
|---|---|---|
| 0 621 161 | 1/1994 | European Pat. Off. . |
| 2527154 | 5/1983 | France . |
| 2591979 | 12/1986 | France . |
| 40 35 805 | 11/1990 | Germany . |
| 42 20 991 | 6/1992 | Germany . |
| 44 12 430 | 4/1994 | Germany . |
| 44 46 358 | 12/1994 | Germany . |

*Primary Examiner*—Matthew C. Graham
*Attorney, Agent, or Firm*—Senniger, Powers, Leavitt & Roedel

[57] ABSTRACT

A brake control arrangement for a composite vehicle including a tractor and at least one trailer possessing an electronic brake control and a mechanical brake control, each producing a fluid pressure supplied to the brakes of the trailer based on brake demand for braking of the vehicle. A trailer control valve in the tractor receives the two pressurized fluids and selects the greater of the two fluid pressures, routing the fluid having the greater pressure to the trailer brake. A stop valve is connected between the mechanical brake control and the trailer control valve and is controlled by a monitoring device of the electronic brake control such that, during a normal mode of operation of the electronic brake control, the stop valve prevents the flow of fluid from the mechanical brake control to the trailer control valve and during an error mode the stop valve permits the flow of fluid from the mechanical brake control to the trailer control valve. The electronic brake control modifies the fluid pressure as a function of the weight of the trailer or as a function of the coupling force between the tractor and the trailer.

18 Claims, 1 Drawing Sheet

BRAKE CONTROL ARRANGEMENT FOR COMPOSITE VEHICLES

BACKGROUND OF THE INVENTION

The invention relates to a brake control arrangement for controlling braking of a composite vehicle including a tractor and at least one trailer, and more particularly to such a brake control arrangement having an electronic brake control and a mechanical brake control.

For a truck or semitrailer tractor, the brake pressure required for braking is fed to the trailer (or semitrailer) by means of a compressed air line or the like. In an ideal case, said brake pressure should be adjusted or regulated such that the trailer is decelerated at exactly the same braking rate as its tractor. A braking behavior of the trailer and tractor which is matched in such a way has the considerable advantage that the braking process may be controlled with great precision and neither the trailer nor the tractor may jack-knife. It is permissible, however, to select the braking deceleration of the trailer to be slightly greater than that of the tractor, since, in such a case, on one hand, the braking process is still controllable and, on the other hand, this treats the maintenance intensive brakes of the tractor with care.

Since, in the course of time, the braking power of the brakes of the trailer changes to a different extent than those of the tractor, the desirable relationship, explained above, of the braking power of trailer and tractor can be guaranteed only with maintenance at relatively short service intervals. Furthermore, it must be taken into consideration that the weight of the trailer changes as a function of the respective load, such that a precise adjustment is possible in any case only in the presence of a so-called automatic load-dependent brake device ("ALB"). But this is the case only with modern trailers, where an ALB-device is present in the trailer, which modifies, as a function of the trailer weight, the brake pressure (brake requirement) fed from the tractor and feeds said modified brake pressure to the brakes of the trailer.

In order to obtain a better braking effect, even in a composite vehicle, the trailer of which is not yet equipped with the ALB function, a so-called "coupling force regulator" has been proposed, for which the force appearing at the coupling between tractor and trailer is measured and the brake pressure for the trailer is regulated as a function of said force such that the coupling force acting in the lengthwise direction of the traction link is as limited as possible. In the braking process, this signifies that the amounts of braking deceleration of the tractor and trailer are of equal magnitude.

Examples of such a regulation of the coupling force are shown in DE 42 20 991 A1, U.S. Pat. No. 5,002,343 or DE 40 35 805 C1.

Since the use of sensors to measure the coupling force is problematic in the rough operation of trucks (because of the frequent failure of sensors) and since said sensors are also relatively expensive, it was proposed, in the not previously published German Patent Application P 44 12 430, and the likewise not previously published German Patent Application P 44 46 358.8, to abandon such coupling force sensors and to detect the slope and weight of the trailer by means of the use of an energy equation with the use of measurable variables present in the tractor, such as vehicle velocity and driving energy.

Likewise, it is known from EP 0 621 161 A1, how the force acting between the tractor and the trailer may be detected and used in order to regulate the brake pressure of the trailer.

Also becoming more common in trucks are electric, or electronic, brake controls (EBR), for which an electronic control device prepares a pneumatic or hydraulic brake pressure for the brakes of the tractor based on the brake demand of the driver and a multitude of additional measured and/or stored parameters. For safety reasons, it is specified, as a matter of principle, that in case of error in the EBR, a conventional mechanical brake control arrangement must be present in addition, which, in a very conventional way, produces a pneumatic or hydraulic brake pressure. For said brake system, which is available on the market, a trailer control valve is provided which is arranged in the tractor, to which are fed the brake pressures of the electronic brake device (EBR) and of the conventional mechanical brake device. The trailer control valve is constructed such that, in each case, it directs the maximum pressure at both of its inputs through to the brakes of the trailer. The trailer control valve is consequently a maximum value selection valve.

With a modern trailer, which already features automatic load-braking (ALE), the brake pressure routed by the trailer control valve to the trailer is modified as a function of the trailer load.

In some countries, the use of automatic load gradual braking (ALB) in a trailer or semitrailer is not common, nor is it expected to be in the future. This signifies a considerable forfeiture of stability. Even if such a vehicle is equipped with an antilock system (ABS), its function will worsen since it must always regulate from a pressure level which is too high. Further, the wear on the tires is greater, since, for all braking during operation of a partially loaded or empty semitrailer or trailer, the brake pressure for the trailer is too high and, as a result, the antilock system is employed, resulting in the occurrence of slippage values of approximately 15% instead of only approximately 1%, as is common for a load-dependent brake.

SUMMARY OF THE INVENTION

The object of the invention is to improve the known brake control arrangement to the extent that a tractor equipped with a brake control arrangement in accordance with the invention can also operate with trailers or semitrailers which are not equipped with a device for load-dependent gradual braking (ALB), with the trailer being braked, nevertheless, as a function of load.

The object of the invention is achieved by means of the features indicated in claim 1. Advantageous configurations and improvements of the invention are disclosed in the dependent claims.

The invention creates a brake control arrangement for a composite vehicle, consisting of a tractor and at least one trailer, with the brake control arrangement featuring an electronic brake control, which, as a function of brake demand, produces a first brake pressure for the brakes of the trailer, as well as a mechanical brake control (pneumatic or hydraulic), which, likewise as a function of the brake demand, produces a second brake pressure for the brakes of the trailer, with a trailer control valve, to which are fed the first and second brake pressures and which directs the greater of said pressures through to the brakes of the trailer, with the invention providing that a stop valve is connected between the mechanical brake and the trailer control valve, and allows the second brake pressure through to the trailer control valve only if the electronic brake control is operating in a defective fashion. In contrast to the state of the art, in which the electronic and mechanical brakes are constantly "active" and feed the respective current brake pressure to the trailer control valve, which therefore works with two active channels, in the invention, only the channel of the electronic brake is active in the sense that the brake pressure it produces is fed to the trailer control valve, while the channel of the mechanical (pneumatic or hydraulic) production of brake pressure operates only in the background and the brake pressure it generates is blocked by means of the stop valve and consequently does not reach the trailer control valve, provided that the electronic brake is functioning soundly. In this sense, the invention is operating with only one active channel. For safety reasons, the stop valve is operated as a so-called "fail-safe" valve, i.e., in its active operating position, held by means of an electric current, the valve is closed and consequently separates the mechanical brake control from the trailer control valve, whereas, if said electric current fails, the stop valve automatically returns to its rest position in which the connection between the mechanical brake control and the trailer control valve is made. In this case, the trailer control valve selects the greater of the two input pressures and transmits this to the trailer brake. If the electronic brake device fails, the brake pressure it provides is at the value "0," such that the mechanical brake pressure is higher and brakes the trailer.

The electronic brake control contains a monitoring device which constantly monitors the function of the electronic brake control. Said monitoring device produces an active output signal in order to block the stop valve only when no error is detected. For a total power failure of the electronic brake control, for instance, the electric signal for actuating the stop valve consequently will also fail such that the latter will achieve its "safe" rest position and connect the mechanical brake control to the trailer control valve.

The electronic brake control for the trailer brake provides for a pneumatic or hydraulic brake pressure which is a function, on one hand, of the brake demand of the driver and, on the other hand, also of the weight of the trailer or semitrailer, such that a load-dependent brake pressure which generally differs from the brake pressure applied at the tractor is fed to the trailer. Consequently, the trailer need not be equipped with an ALB function. Rather, said function is taken over by the electronic brake control, which is arranged in the tractor. For said purpose, a signal produced in accordance with the aforementioned state of the art, and corresponding to the weight of the trailer or semitrailer or to the coupling force between tractor and trailer is fed to the electronic brake control. The brake pressure prepared for the trailer is modified as a function of this signal.

In contrast, when the electronic brake control fails, the same brake pressure is fed to the trailer brake as to the tractor. The ALB function for the trailer is then no longer available. Provided that the traction link is provided with an antilock device, the ABS would continue to function, however, and prevent an extremely dangerous brake condition.

BRIEF DESCRIPTION OF THE DRAWINGS

The invention is explained below with the aid of an embodiment in conjunction with the figure.

DETAILED DESCRIPTION OF THE PREFERRED EMBODIMENTS

Figure 1:
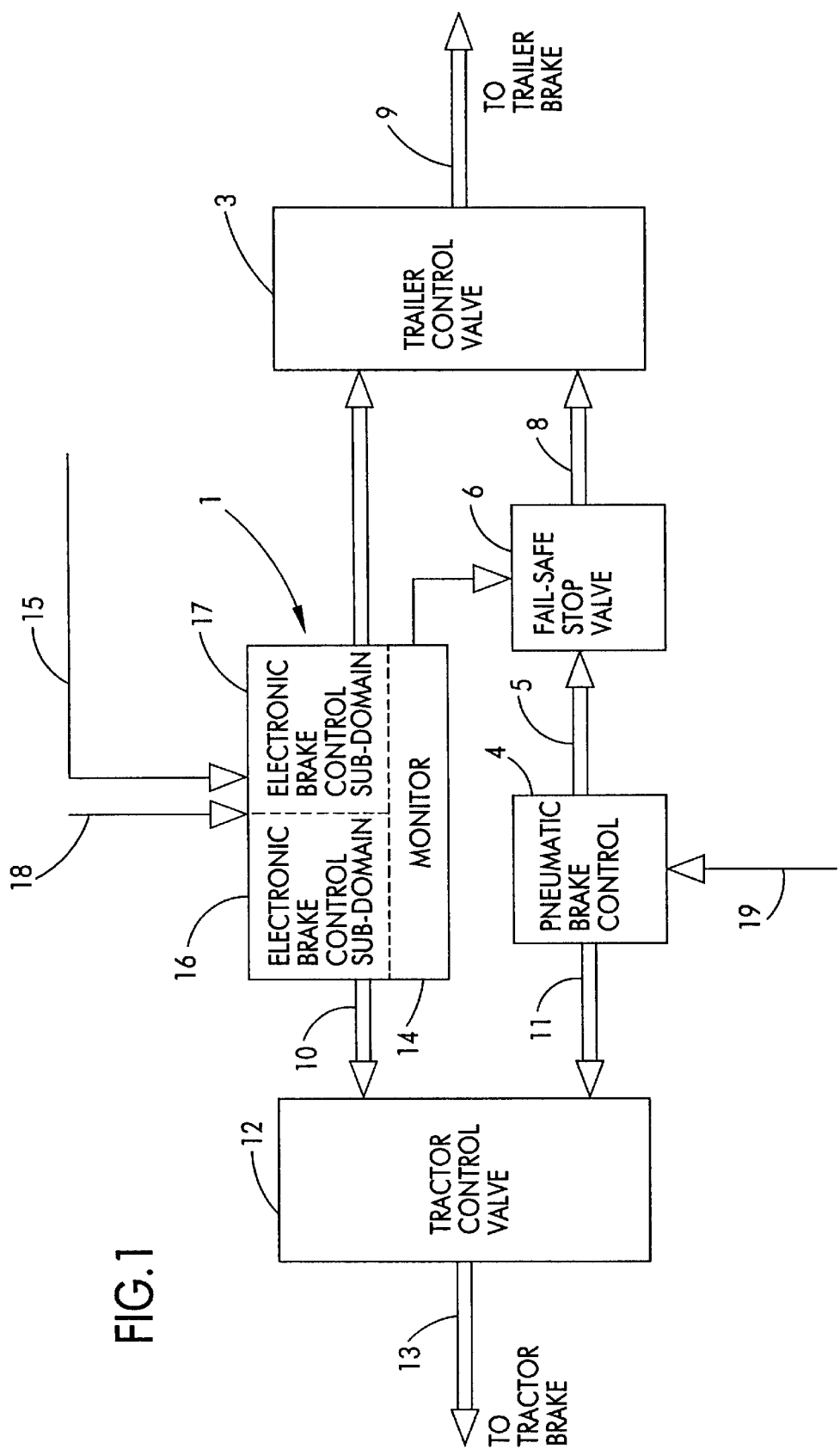
FIG. 1 shows a block diagram of the brake control arrangement in accordance with the invention.

All of the parts shown in FIG. 1 are arranged on a tractor (not shown). The brake control arrangement of FIG. 1 shows an electronic brake control (1) which, from electric input signals and a pressurized fluid source (not shown), outputs pneumatic or hydraulic brake pressure on a pressure line (2) which is fed to an input of a trailer control valve (3). In addition, the brake control arrangement possesses a mechanical, i.e., a pneumatic or hydraulic brake control (4) which, in a conventional way, as a function of brake demand, such as the depressing of a brake pedal by the driver, produces a pneumatic or hydraulic pressure which is output to a pressure line (5). In the invention, said pressure is fed to an input of a stop valve (6), the output of which is connected, by means of an additional pressure line (3), to a second input of the trailer control valve (3). The trailer control valve (3) is constructed as a maximum value selection valve, i.e., it directs the greater of the two pressures at its inputs through to its output, which is connected to a pressurized fluid line (9), which is, in turn, connected, by means of a coupling (not shown), to the brake system of the trailer or semitrailer (not shown).

The brake pressure for the tractor is also produced in a similar way, but without the stop valve. The electronic brake control (1) has a second pressurized fluid output, which is connected to a pressure line (10). Likewise, the mechanical brake control (4) has a second pressurized fluid output, which is connected to a pressure line (11). The pressure lines (10,11) are connected to a tractor control valve (12) which, just as the trailer control valve is configured as a maximum value selection valve and which outputs the greater of two input pressures to a pressurized fluid line (13), which is connected to the brakes or brake cylinders of the tractor.

The electronic brake control (1) includes a monitoring device (14), which, in a known way, monitors the functional capability of the electronic brake control and detects operating errors, or a total failure. The monitoring device is configured such that with an error-free status of the electronic brake control (1), it outputs, on an electrical line (7), an active signal, i.e., a voltage or current which actuates the stop valve (6). The stop valve is in the form of a "fail-safe", valve, i.e., it actively blocks the connection between the pressure lines (5,8) when a voltage is present on the line (7), i.e., when the stop valve (6) is electrically energized. If, in contrast, the voltage on the electrical line (7) is below the response threshold of the stop valve (6), then the latter will release to its rest position, which is usually carried out by means of the force of a mechanical spring. In said rest position, the pressure lines (5,8) are connected to each other such that the brake pressure prepared, at last, by the mechanical brake control (4) is fed to an input of the trailer control valve (3). Since, in case of an error the pressure of the pressurized fluid which is imparted on the pressure line (2) by the electronic brake control (1), has a value of "0," the pressure on the pressure line (8) is greater than that on the pressure line (2), so that the trailer control valve (3) then selects the pressure on the pressure line (8) and directs it to the pressure line (9) and, consequently, to the trailer brake. Consequently, safe braking is guaranteed in the event of an error. An error is also, among other things, a total failure of the electric power supply of the vehicle. Even in said case, the monitoring circuit (14) would switch off the current on the line (7) and the stop valve (6) would assume the described rest position.

The electronic brake control (1) is divided here into two systems (16,17). System (16) is responsible for determining the brake pressure for the tractor and system (17) is responsible for determining the brake pressure for the trailer or semitrailer. Both systems are supplied, by means of an electrical line (18), with an electrical brake demand signal, which, e.g., is sensed by means of a potentiometer which is connected to the brake pedal of the tractor. A different brake demand consequently results in accordance with the amount of depression, i.e., the position of the brake pedal. The electronic brake device generates therefrom the brake pressure for the tractor in the system (16).

Since the invention starts from the assumption that the trailer brake has no ALB function (load-dependent gradual braking) available, said function is implemented in system (17) of the electronic brake control (1). This signifies that a signal which corresponds to the weight of the trailer or semitrailer or one which corresponds to the coupling force between tractor and trailer is fed to system (17) by means of an electrical line (15); said signal is taken into consideration by system (17) of the electronic brake control (1) when detecting the brake pressure for the trailer brake. Said signal on the line (15) may be produced in any optional way, as known, e.g., from the state of the art cited in the introduction.

When the trailer is only partially loaded or empty, the brake pressure for the trailer must, in most cases, be less than the brake pressure for the tractor, since the brake force acting between the tires and the road is a function of the force which acts perpendicular to the road surface. Since the braking force between tires and roadway is a function of the brake pressure, for optimal braking, the brake pressure must also consequently be a function of said perpendicular force and, consequently, of the trailer weight. But it may also be that the braking effect of the trailer brakes is very poor, i.e., a higher brake pressure may be required for a relatively small braking effect. This could also be taken into consideration in the electronic brake control, with the result that the brake pressure for the trailer may also be greater than that for the tractor. This may be ascertained, e.g., by means of detecting the coupling force between tractor and trailer, with a corresponding signal being fed on the electrical line (15) to the system (17).

The mechanical brake control (4) obtains the brake demand in a known way, by means of an actuator, represented schematically by arrow 19, which may be, e.g., the brake pedal of the tractor. The brake pressure is generated therefrom, both for the tractor as well as for the trailer brake; the brake pressure is supplied via the pressure lines (11,5) to the given brakes. Of course, both of the aforementioned pressures may be of different magnitudes, in accordance with a distribution of brake force between trailer and tractor which is established at the factory.

A tractor equipped with the brake control arrangement in accordance with the invention may consequently also be coupled to trailers or semitrailers, which themselves do not feature automatic load gradual braking. In spite of this, the trailer may be braked in accordance with an ALB function which is produced at the tractor. Consequently, improved driving stability is obtained along with more limited tire wear at the trailer, as well as—provided that the trailer is equipped with an antilocking function—an improvement of said antilock protection, since it no longer must regulate from a pressure which is too high, but only from a brake pressure which is more limited, which makes for a more rapid and sensitive antilocking control.

I claim:

1. A brake control arrangement for controlling braking of a composite vehicle including a tractor and a trailer, the tractor and trailer each having a respective brake, the vehicle having a braking actuator movable between a braking position in which a brake demand is applied to the brakes to effect braking of the vehicle and a non-braking position, said brake control arrangement comprising:

an electronic brake control communicating with the braking actuator and adapted for pressurizing a braking fluid to have a first braking pressure upon actuation of the braking actuator to its braking position, a mechanical brake control communicating with the braking actuator and adapted for pressurizing a braking fluid to have a second braking pressure upon actuation of the braking actuator to its braking position, a trailer control valve having a first inlet communicating with the electronic brake control for receiving the fluid having the first braking pressure and a second inlet communicating with the mechanical brake control for receiving the fluid having the second braking pressure, the trailer control valve having an outlet communicating with the brake of the trailer for delivering fluid under pressure to the trailer brake, said control valve being adapted for directing the fluid having the greater of said first braking pressure and said second braking pressure through the valve outlet for delivery to the trailer brake; and a stop valve intermediate the mechanical brake control and the trailer control valve for blocking the flow of the fluid having the second fluid pressure to the trailer control valve, the stop valve being operatively connected to the brake control such that the stop valve permits the flow of the fluid having the second fluid pressure to the trailer control valve when the electronic brake control is operating in an error mode.

2. A brake control arrangement as set forth in claim 8 wherein the stop valve is moveable between a closed position in which the fluid having the second braking pressure is blocked against flow to the trailer control valve and an open position in which the fluid is allowed to flow to the trailer control valve, the stop control valve being in its closed position when the electronic brake control is operating in a normal mode and being in its open position when the electronic brake control is operating in the error mode.

3. A brake control arrangement as set forth in claim 2 wherein the electronic brake control is capable of generating an electrical signal, the stop valve being electrically connected to the electronic brake control for receiving and responding to the electrical signal.

4. A brake control arrangement as set forth in claim 3 wherein the electronic brake control includes a monitoring device capable of monitoring the electronic brake control for operation in the normal mode and the error mode, the electrical signal being emitted by the monitoring device during operation in the normal mode of the electronic brake control whereby the stop valve is held in its closed position to block the flow of fluid from the mechanical brake control to the trailer control valve, the monitoring device switching off the electrical signal upon detecting operation in the error mode of the electronic brake control whereby the stop valve moves to its open position to allow fluid to flow from the mechanical brake control to the trailer control valve.

5. A brake control arrangement as set forth in claim 4 wherein the electronic brake control is capable of adjusting the first braking pressure in proportion with the weight of the trailer.

6. A brake control arrangement as set forth in claim 5 wherein the first braking pressure is adjustable in proportion with the weight of the trailer and the brake demand created upon movement of the brake actuator.

7. A brake control arrangement as set forth in claim 4 wherein the second braking pressure is less than the first braking pressure.

8. A brake control arrangement as set forth in claim 3 wherein the electronic brake control is capable of adjusting the first braking pressure in proportion with the weight of the trailer.

9. A brake control arrangement as set forth in claim 8 wherein the first braking pressure is adjustable in proportion with the weight of the trailer and the brake demand created upon movement of the brake actuator.

10. A brake control arrangement as set forth in claim 3 wherein the second braking pressure is less than the first braking pressure.

11. A brake control arrangement as set forth in claim 2 wherein the electronic brake control is capable of adjusting the first braking pressure in proportion with the weight of the trailer.

12. A brake control arrangement as set forth in claim 11 wherein the first braking pressure is adjustable in proportion with the weight of the trailer and the brake demand created upon movement of the brake actuator.

13. A brake control arrangement as set forth in claim 2 wherein the second braking pressure is less than the first braking pressure.

14. A brake control arrangement as set forth in claim 1 wherein the electronic brake control is capable of adjusting the first braking pressure in proportion with the weight of the trailer.

15. A brake control arrangement as set forth in claim 14 wherein the first braking pressure is adjustable in proportion with the weight of the trailer and the brake demand created upon movement of the brake actuator.

16. A brake control arrangement as set forth in claim 15 wherein the second braking pressure is less than the first braking pressure.

17. A brake control arrangement as set forth in claim 14 wherein the second braking pressure is less than the first braking pressure.

18. A brake control arrangement as set forth in claim 1 wherein the second braking pressure is less than the first braking pressure.

* * * * *